S. A. STONE.
ROAD GRADER.
APPLICATION FILED JAN. 13, 1910.
962,267.
Patented June 21, 1910.
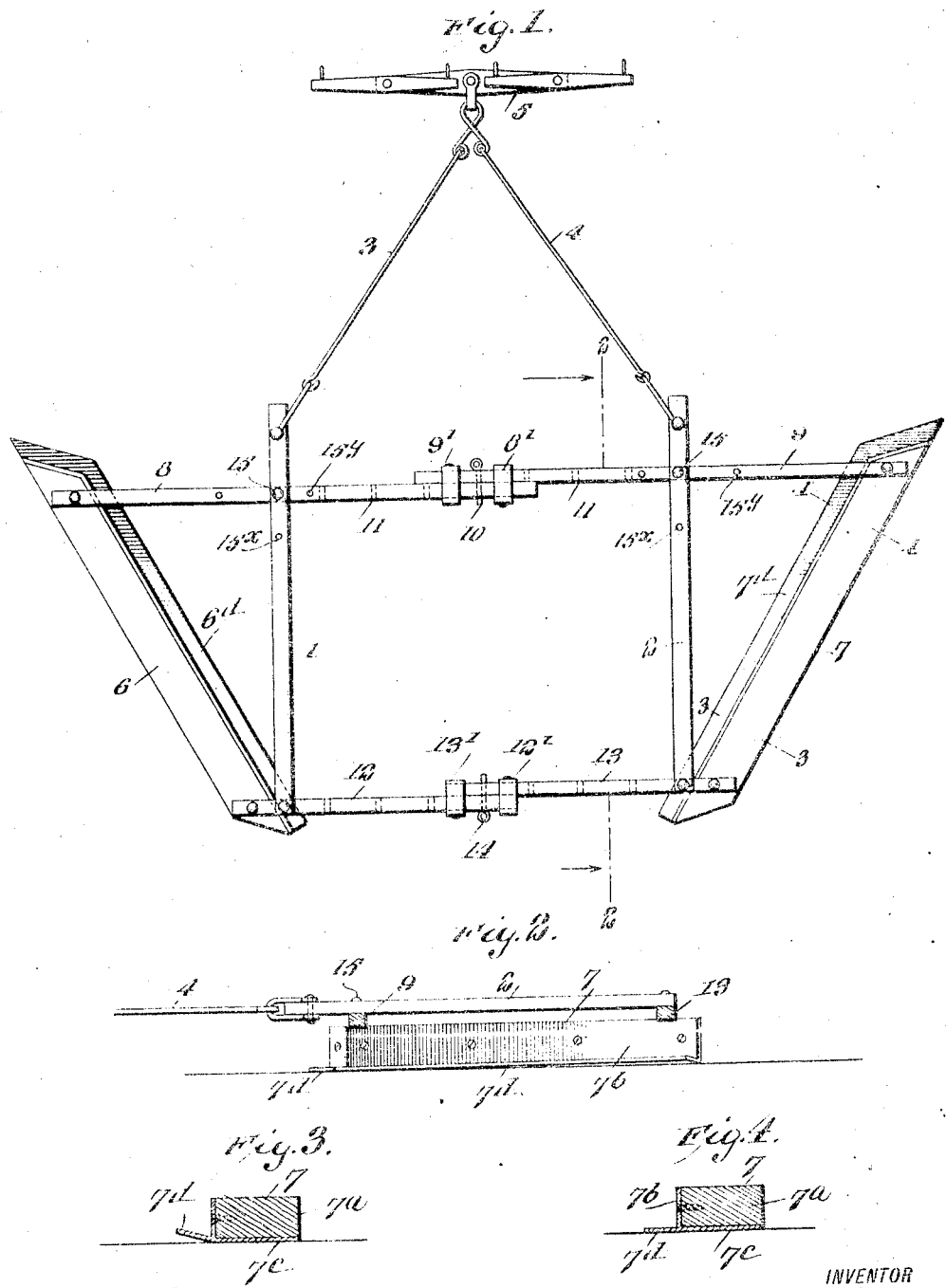
INVENTOR
SPENCER A. STONE
ATTORNEYS

UNITED STATES PATENT OFFICE.

SPENCER ALLEN STONE, OF CHILLICOTHE, MISSOURI.

ROAD-GRADER.

962,267.

Specification of Letters Patent.  Patented June 21, 1910.

Application filed January 12, 1910.  Serial No. 537,209.

*To all whom it may concern:*

Be it known that I, SPENCER ALLEN STONE, a citizen of the United States, and resident of Chillicothe, in the county of Livingston and State of Missouri, have invented certain new and useful Improvements in Road-Graders, of which the following is a specification.

My invention relates to improvements in devices for scraping and grading road-beds, and it consists in the combinations, constructions, and arrangements herein described and claimed.

An object of my invention is to provide a device which will scrape the road and round the center of the road, but which will not skid while drawing the dirt from the sides to the center of the road.

A further object of my invention is to provide a device having means for adjusting the positions of both the forward and the rear ends of the scrapers.

A further object of my invention is to provide a device having a pair of scrapers symmetrically disposed and provided with cutters for digging out the earth at their forward ends, and being raised slightly at their rear ends to ride over and crush the clods.

Other objects and advantages will appear in the following specification, and the novel features of the device will be particularly pointed out in the appended claims.

My invention is illustrated in the accompanying drawings, in which:

Figure 1 is a plan view of the device, Fig. 2 is a section along the line 2—2 of Fig. 1, looking in the direction of the arrows, Fig. 3 is a section along the line 3—3 of Fig. 1, and Fig. 4 is a section along the line 4—4 of Fig. 1.

In carrying out my invention, I provide the parallel strips 1 and 2 which are attached at their forward ends by means of the links 3 and 4, to the double-trees 5. In place of the double-trees other draft appliances may be used depending upon the number of draft animals.

The scrapers are shown at 6 and 7. They consist of beams which are secured to angle irons in the manner shown in Figs. 3 and 4. The forward ends of these scrapers are formed as shown in Fig. 4. In this figure, the beam 7ª is secured to the upright portion 7ᵇ of the angle iron. A portion 7ᶜ of the base of the angle iron extends underneath the beam 7ª while another portion 7ᵈ extends outside and forms a cutter. The part of the cutter near the forward end lies close to the ground as shown in Fig. 4, or may be even slightly inclined thereto, so as to form a plowing or cutting member for digging into the earth. Toward the rear end of the scraper, the portion 7ᵈ is bent upwardly as shown in Fig. 3. The change from the position shown in Fig. 4 to that shown in Fig. 3 is brought about by a gradual twist in the member 7ᵈ.

The beam 1 is adjustably connected with an arm 8 while the member 2 is similarly connected with the arm 9. These arms 8 and 9 are provided with collars 8¹ and 9¹, respectively, for engaging the opposite arm and the arms are held in position by means of a pin 10, which is arranged to enter the perforations 11 in the arms. The arms 9 and 8 are adjustably connected to the longitudinal beams 1 and 2 respectively by the pins 15 which are adapted to enter the slots 15ˣ and 15ʸ. The rear ends of the scrapers are similarly secured by means of the adjustable arms 12 and 13, which are held by means of the pin 14, and the collars 12¹ and 13¹.

From the foregoing description of the various parts of the device, the operation thereof may be readily understood.

The scrapers may be set at varying distances apart to accommodate roads of various widths and also at varying angles by merely adjusting the arms 8 and 9, or 12 and 13. As the machine is drawn forward, the forward edges of the cutters dig into the earth, which is then forced toward the center. As the rear end of the scrapers meets the earth, the elevated portion of the cutters ride over it, crushing the clods and tending to heap the dirt in the center. Since there are two scrapers acting in opposite directions, the resulting tendency is for the force to be equalized and therefore there is no tendency for the machine to skid. The fact that the scrapers may be set at varying distances and varying angles enables the work to be done to be apportioned according to the number of draft animals used. Thus, for heavy draft, the scrapers may be set at quite an angle to the parallel strips 1 and 2, while for a lighter draft, they may be set more nearly parallel.

Another feature to which I desire to call especial attention is the fact that there are very few parts. For this reason, the grader may be cheaply manufactured. The simplicity of parts, moreover, renders the device less liable to get out of order.

I claim:

1. In a road grader, a pair of oppositely disposed scrapers, a frame connecting said scrapers, said frame comprising a pair of longitudinal parallel rods, a pair of transverse parallel rods pivotally secured to one of said scrapers, one of said transverse rods being adjustably secured to one of said longitudinal parallel rods, and a second pair of transverse parallel rods secured to the other scraper and being adjustably secured to the other of said longitudinal rods, the respective ends of each pair of transverse rods being adjustably secured together.

2. In a road grader, a pair of scrapers, cutters secured to the bottoms of said scrapers, the forward end of said cutters lying close to the ground so as to form a plowing or cutting member, and the rear end of the cutter being curved upwardly to form a crusher and a shaper.

3. In a road grader, a pair of scrapers, cutters secured to the bottoms of said scrapers, the rear ends of said cutters being curved upwardly, means for adjusting the forward ends of said scrapers toward and away from each other, and means for adjusting the rear ends of said scrapers toward and away from each other.

SPENCER ALLEN STONE.

Witnesses:
ROBERT EDGAR REYNOLDS,
JESSE R. PALMER.